United States Patent Office 2,995,672
Patented Aug. 8, 1961

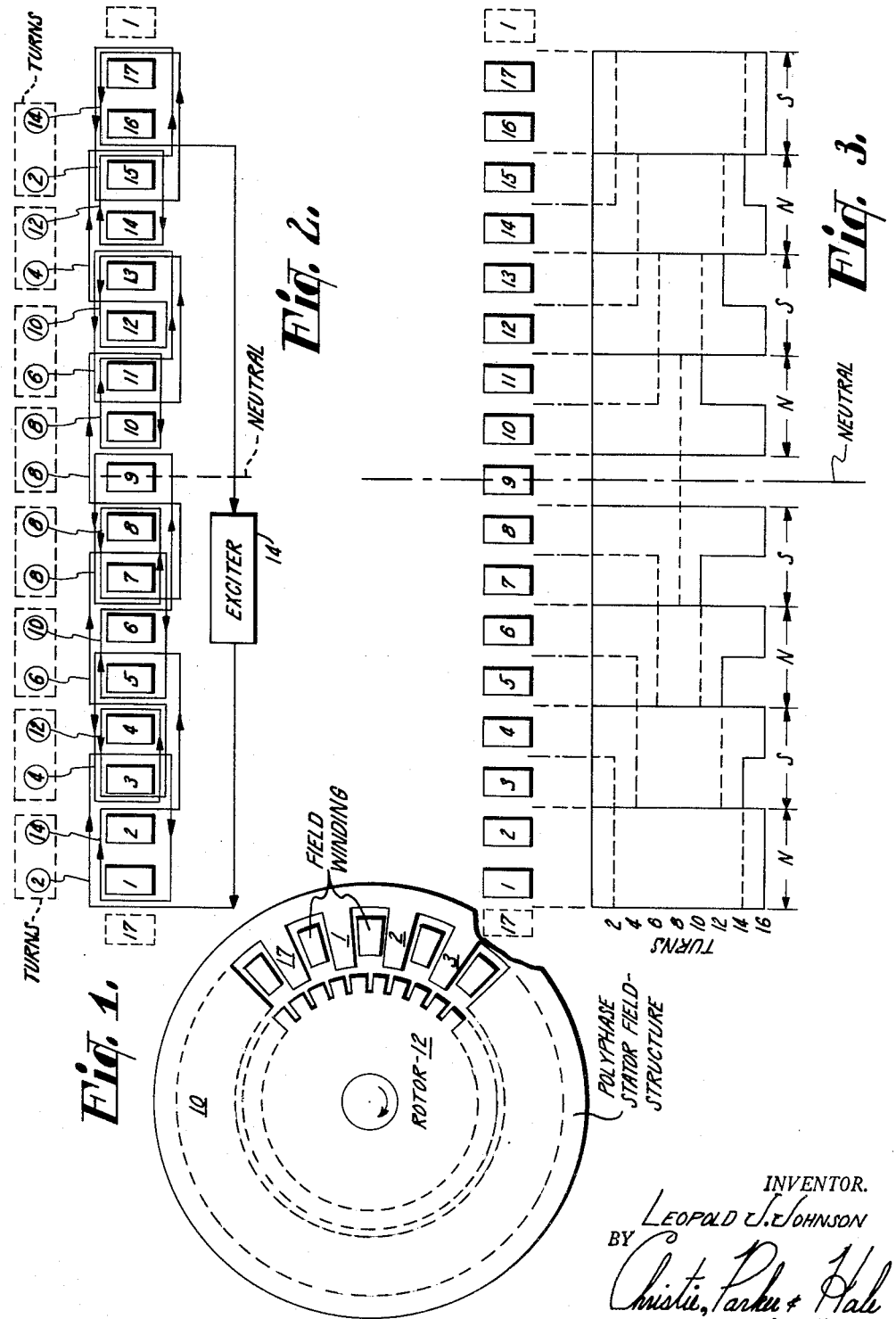

2,995,672
WINDINGS FOR DYNAMO-ELECTRIC MACHINES
Leopold J. Johnson, Anaheim, Calif., assignor to The Siegler Corporation, Anaheim, Calif., a corporation of Delaware
Filed Feb. 13, 1959, Ser. No. 793,093
16 Claims. (Cl. 310—180)

This invention relates to dynamo-electric machines and more particularly to magnetic field structures for alternators.

In the design of alternators, the wave shape of the generated voltage or E.M.F. is an important factor. In non-salient pole alternators, the wave shape of the generated E.M.F. is generally controlled by shaping the form of the flux provided for the magnetic poles. Due to the conventional usage of balanced winding or an even number of slots per pole per phase in the alternator construction, harmonics are generated each time the rotor is rotated from slot to slot. Generally, the odd harmonics, such as the third and fifth, are found to be prevalent in the output wave form. This flux form is shaped to prevent the generation of harmonics since the presence thereof alters the desired sinusoidal output wave. The conventional methods for shaping the flux form to reduce the harmonic content of the sinusoidal output wave consist of using a large number of slots per pole per phase, skewing of the slots and poles, and the usage of a fractional number of slots per pole per phase. These approaches have generally been satisfactory but are all directed to the non-generation of the harmonics. There is a need for signal generators of the dynamo-electric type capable of producing good sinusoidal output waves for control applications.

This invention provides an improved dynamo-electric machine wherein the magnetic circuits for the armature and field are asymmetrically formed to cause the harmonics to be generated with a phase displacement to cancel one another while the waves comprising the fundamental are generated as complementary phase displaced waves and which complementary waves combine to provide an essentially harmonic free sinusoidal output wave. This asymmetrical magnetic relationship coupling the armature and field when applied to a non-salient pole machine provides a coupling factor essentially the same as for salient pole machines and yet resulting in a more efficient alternator since there are no circulating currents in the windings. The asymmetrical magnetic arrangement results by suitably proportioning the winding means for either the magnetic field or the armature to cause the generated harmonics to cancel up to the harmonic having an absolute value equivalent to the odd or prime number of slots. The odd number is selected to be large relative to the fundamental wave since it is the first harmonic present in the output wave and thereby has little effect on the sinusoidal output wave.

In the disclosed embodiment, a field for a non-salient pole alternator is provided through the provision of a continuous winding wound and proportioned for defining magnetic poles whereby the alternate or opposite and successive magnetic poles have pole centers which are progressively shifted in opposite directions relative to a magnetic neutral to thereby define a discontinuous single phase flux form. The field structure comprises a conventional magnetic structure having an odd number of conductor carrying slots spaced apart by magnetic teeth. The odd number of magnetic teeth and slots provided in accordance with this invention is preferably a prime number of slots. The winding means is balanced and arranged as a mirror image on the magnetic structure with each winding portion having two portions defining a magnetic pole.

The basic winding configuration for defining a single magnetic pole consists of a number of turns having a preselected slot span, in this instance three, and a second winding portion wound in the same magnetic sense but having a lesser slot span, such as a span of two slots. The windings are wound on the magnetic structure in this fashion and arranged thereon so that the successive winding portions and thereby a portion of the magnetic poles overlap. This configuration results by winding the adjacent magnetic pole to begin within the magnetic circuit intermediate the winding portions for the previous magnetic poles. In the example under consideration, the second pole would be defined by a winding portion starting in the third slot (intermediate the second and third slots or two winding portions). Arranging the windings in this manner and with successive poles having different polarities, a cancellation of flux results in the overlapping magnetic circuits. The number of turns are controlled whereby a tooth, the odd tooth, has all of its flux cancelled out to thereby provide a magnetic neutral. This arrangement of winding turns is proportioned so that the total number of turns for any one magnetic pole is the same but the number of turns for each winding portion is proportioned to progress in different directions relative to the magnetic neutral while maintaining the total number of turns for each pole substantially the same. The arrangement of the windings progressively shifts the pole centers of successive magnetic poles in opposite directions relative to this magnetic neutral to define an asymmetrical and yet balanced relationship between the field and the armature.

These and other features of the present invention may be more fully appreciated when considered in the light of the following specification and drawings, in which:

FIG. 1 is a partial sectional view of an alternator construction showing the rotor and stator construction;

FIG. 2 is a developed view of the stator slots and teeth showing the winding means wound thereon and embodying the invention; and FIG. 3 is a graphical illustration of the resulting effective flux forms for the successive magnetic poles, neglecting polarities, for the single phase winding of FIG. 2.

The concept of this invention will be described in conjunction with the field structure for a conventional alternator or alternating current generator including a symmetrically arranged polyphase stator structure 10 and an armature core, identified as the rotor 12. The armature 10 and rotor 12 are considered for purposes of explanation to have the same number of conductor carrying slots. The stator structure 10 in this instance is arranged to provide a two-phase magnetic field for the rotatable armature 12 to provide the alternating current output. It will be understood that the rotor may provide the field for the alternator, while the armature comprises the stator. Since a polyphase winding comprises merely two or more single phase windings symmetrically spaced on its magnetic structure in accordance with the phase rating of the alternator, it is convenient to describe the invention in terms of a single phase winding.

Now referring to FIGS. 2 and 3 wherein a single phase winding for the two-phase alternator is shown, the details of the field structure will be examined. The magnetic structure of the stator 10 comprises a plurality of current carrying slots separated by magnetic teeth, as is conventional. The number of slots provided for the stator 10 is arranged according to this invention to be an odd number and preferably the odd number is also a prime number, such as the seventeen slots illustrated. It will be recognized that a prime number comprises any number that is divisible only by one or itself, such as the numbers 17, 19, 23, and the like. This arrangement of seventeen slots is wound to define eight alternating and successive magnetic poles. The tooth identified as tooth 9 will be considered as the magnetic neutral, whereby the windings will be seen to be mirror images of one another on either side of this magnetic neutral, as will become more apparent hereinafter. Accordingly, four magnetic poles are defined on either side of the magnetic neutral. The continuous winding for the single phase is wound in the conductor carrying slots around the teeth and is energized from an exciter shown in block form and identified by the reference number 14.

The basic winding arrangement of this invention is best described in conjunction with a specific example. The specific example to be described is the winding illustrated in FIG. 2 having the prime number of slots and with the understanding that any odd number of slots will provide the same winding pattern. The winding scheme will be described by first considering the winding arrangement for a single pole and then the relationship of the windings of a pair of adjacent poles. The pair of adjacent poles to be described first will be the poles defined on opposite sides of tooth 9 or the magnetic neutral.

Considering the pole defined to the left hand side of the magnetic neutral first, it will be seen that the basic configuration for defining this south pole consists of a number of turns having a preselected slot span, in this instance three, with a second winding portion wound in the same magnetic sense but having a lesser slot span, shown as a span of two slots. The winding portion having the greater slot span spans teeth 7—9, while the winding portion having the short slot span spans teeth 7 and 8. It should be noted that for purposes of describing the invention the windings are considered as positioned within the slots in the half of the slots adjacent the magnetic tooth it is coupled to. The total number of turns for each winding portion defining a single magnetic pole is indicated by the box shown in dotted outline enclosing the circled numeral representing the number of turns for each winding portion defining a single magnetic pole, e.g. the south pole under consideration is shown as having eight turns for each winding portion. It will be recognized that since the two winding portions are wound in the same magnetic sense, all the winding turns wound around teeth 7 and 8 will combine to give a total of sixteen turns around these teeth, while tooth 9 will have merely eight turns coupled around same.

The magnetic pole shown immediately to the right of the magnetic neutral will be seen to be wound in the same fashion as the south pole described immediately hereinabove but in a sense to define a north pole. The winding portion for this north pole commences in the slot between teeth 8 and 9 and has a span the same as the corresponding winding portion for the south pole described so as to span teeth 9—11. The shorter winding portion is wound to span teeth 10 and 11. It should be noted that the winding portion spanning teeth 10 and 11 is displaced one tooth to the right from the corresponding arrangement for the south pole to the left of tooth 9. This arrangement then is the mirror image of the corresponding winding on the opposite side of tooth 9. Once again the number of winding turns utilized to define this pole is shown as eight turns for each of the winding portions. This arrangement will then provide a total of sixteen turns coupled around teeth 10 and 11 and eight turns around tooth 9. Since tooth 9 is coupled by eight turns from each of the adjacent poles and which turns are wound thereon in opposite magnetic senses, the total flux passing therethrough is cancelled out to thereby cause tooth 9 to act as the magnetic neutral. It will be further recognized that the effective flux for this pair of adjacent poles comprises the flux provided by the sixteen turns wound around teeth 7 and 8 and the sixteen turns around teeth 10 and 11. The effective slot span is therefore equivalent to the two slots or the winding portion having the smaller slot span.

The above basic winding configuration is then wound on the remainder of the teeth to define the improved field structure. The continuous winding may be traced from the exciter 14 by first tracing the two winding portions defining the first magnetic pole or the north pole on the left hand side of the drawings. This pole will have a winding portion spanning teeth 1—3 and a portion spanning teeth 1 and 2. The second pole being a south pole is wound in an opposite magnetic sense from the previous north pole and will have a portion spanning teeth 3—5 with a lesser portion spanning teeth 3 and 4. The third pole, which is a north pole, is wound to have the longer portion spanning teeth 5—7 and the smaller portion spanning teeth 5 and 6. This winding will continue serially to define the south pole adjacent the magnetic neutral and the adjacent north pole on the opposite side of the magnetic neutral and which poles were previously described. It should be noted at this point that the same overlapping relationship that defined the magnetic neutral exists between the above winding portions.

The successive south, north and south poles respectively extending from left to right from the north pole adjacent the magnetic neutral are also wound in this same basic fashion. These poles are arranged and wound so as to span teeth 11—13 with a portion spanning teeth 12 and 13; a portion spanning teeth 13—15 and a smaller portion spanning teeth 14 and 15; while the last pole has a portion spanning teeth 15—17 and a smaller portion spanning teeth 16 and 17. As described for the poles adjacent the magnetic neutral, the number of turns for each of the poles wound in this fashion are identified in the box shown in dotted outline above the turns. Accordingly, progressing from the magnetic neutral and going to the right, it will be seen that the number of turns for the winding portion having the larger slot span will be progressively different by a factor of two, that is, the number of turns will decrease by two turns, while in the same fashion the smaller winding portion will progressively increase by two turns while maintaining the total number of turns defining each magnetic pole the same, namely sixteen turns. With this in mind, now considering this progression with respect to the poles to the right of the magnetic neutral, the north pole adjacent the magnetic neutral has eight turns in each winding portion, the adjacent south pole will have ten turns in its smaller winding portion and six turns in the larger winding portion, while the adjacent north pole will have twelve and four turns respectively, and the pole furthest from the neutral will have fourteen and two turns respectively. An examination of FIG. 2 will indicate that the same progressive relationship exists for the corresponding poles to the left of the magnetic neutral as was the case for the poles progressing to the right of the magnetic neutral.

The effect of winding the magnetic structure in this fashion is best seen by examining FIG. 3, wherein the resultant flux form is plotted for each adjacent magnetic pole without regard to the relative polarities. As described hereinabove, it will be seen that as a result of the overlapping of the eight turns coupled to tooth 9, no flux is effective about this tooth and so a discontinuous flux form for this single phase winding is provided. This relationship of the actual number of turns coupled to tooth 9 is seen in dotted outline in FIG. 3, wherein eight turns are indicated as spanning teeth 7—9, and eight turns are also shown as spanning teeth 9—11. In this same fashion, the effective flux form for each tooth can be developed.

Considering now the generation of the flux form for the first north pole, the pole shown to the left of FIG. 3, it will be seen that this pole is defined by fourteen turns spanning teeth 1 and 2 with two turns spanning teeth 1—3. Accordingly, the north pole will be defined by an irregular flux form having sixteen turns spanning teeth 1 and 2 and with two turns coupled to tooth 3. Considering the adjacent pole, which is a south pole, this pole will be defined by the twelve turns spanning teeth 3 and 4 and the four turns spanning teeth 3—5. In this instance, the effective flux form will have to be considered in connection with the overlapping two turns from the previous pole. This will then give a resultant arrangement wherein tooth 3 is provided with fourteen turns since the two turns from the previous pole must be subtracted from the four turns to add merely two turns to the twelve turns wound thereon. This will then give a flux form as shown in FIG. 3, with a rectangular portion equivalent to two turns cut out from the left hand corner thereof. The overlap of the four turns into the third successive pole will be considered in conjunction with that pole as the above overlap has been considered.

It will be recognized now that since the two turns around tooth 3 have been cancelled, the flux form is defined by the turns coupled to teeth 1 and 2. The pole center for the first pole will be centrally located between teeth 1 and 2, or, in other words, the center line of the slot therebetween. In the same fashion, the center of the adjacent south pole will now be seen to be displaced to the right towards the magnetic neutral as a result of the unbalanced relationship of the two halves of the flux form provided by teeth 3 and 4 for this pole. The progressive shifting of the pole center towards the magnetic neutral will now be appreciated since the flux forms for the successive poles are similarly defined, whereby the unbalanced relationship of the two halves of the flux forms is weighted in favor of the right hand portion as a result of increasing the number of turns for each larger winding portion in the manner described. It will now also be recognized that the pole centers for the poles on the opposite side of the magnetic neutral are proportioned in the same manner to define pole centers that are also shifted progressively towards the magnetic neutral.

It will now be appreciated that in a polyphase machine the winding for another phase will be wound on the magnetic structure in the same fashion but considering a starting point at a slot displaced from tooth 1. To this end, for the two-phase machine under consideration, the winding would be traced beginning with the winding portion positioned between teeth 8 and 9, whereby a magnetic neutral would be defined by tooth 17 for this phase.

It will now also be seen that with a pair of windings wound on the magnetic structure in the manner described, in a two-phase machine we have provided a balanced winding utilizing one slot per pole per phase and yet generating a good sinusoidal wave. The winding of a field in this fashion defines the magnetomotive force and thereby the flux waves for the alternator to cause the harmonics to be generated with a phase displacement to cancel out. This is true of all the harmonics up to the harmonic having an absolute value equivalent to the odd or prime number of slots, so that the first harmonic to be generated is a result of the relative asymmetrical relationship between the field and the armature. Therefore with seventeen slots the effect of the seventeenth harmonic on the shape of the fundamental wave may be neglected. The first harmonic or the fundamental wave generated through the provision of this winding is also phase displaced, but the shifted waves are generated to be complementary and when combined produce a sinusoidal output wave. This sinusoidal output wave will be substantially unmodified as a result of combining with the generated harmonics since they have been cancelled as described.

Although the invention has been described in conjunction with proportioning the number of turns for the teeth of the field structure, it will be recognized that the flux form may be controlled by varying the widths of the teeth to provide the same flux form. To this end, since the concept of this invention is directed to defining an asymmetrical magnetic relationship between the armature and the field, the magnetic field may be defined in a conventional fashion while the armature windings are arranged in an odd or prime number of slots to cause the magnetic pole centers to be effectively progressively shifted relative to the magnetic center of the other, as discussed hereinabove, to cause the desired harmonic cancellation and produce the substantially harmonic free sinusoidal output wave. It will be seen that with a conventional field structure and controlling the width of the teeth the armature windings are defined in the same overlapping fashion whereby the armature conductors are responsive to flux from successive poles to produce currents of opposite polarity to produce the effect of shifted pole centers and thereby the substantially harmonic free sinusoidal output wave form. This winding scheme is also applicable to salient pole machines. It should also be noted that improved sinusoidal output waves result when an odd number of slots are utilized and the winding is arranged to define a magnetically neutral tooth by omitting one tooth, but not shifting the pole centers. The improved results of this latter method of winding is not quite as good as causing the effective shifting of pole centers due to the higher coupling impedance resulting. It will be evident to one skilled in the art that the same winding arrangement may be employed for a motor to eliminate the harmonic variations in torque whereby an extremely smooth motor torque will be produced for rotating the motor shaft.

What is claimed is:

1. In a dynamo-electric machine, an armature, a magnetic field for said armature, one of said elements being defined with a magnetic structure having an odd plurality of conductor carrying slots, and continuous winding means wound in said slots on said magnetic structure to define an asymmetrical magnetic relationship with the other element whereby the currents generated in said armature are displaced in phase to cause the combination of the harmonics generated to cancel while the fundamental waves generated are complementary and displaced in phase and when combined define a substantially harmonic free sinusoidal output wave.

2. In an alternator, an armature, a magnetic field for said armature, each of said elements being arranged with symmetrical magnetic structures having an odd plurality of conductor carrying slots spaced by magnetic teeth, and winding means wound in said slots for each of said magnetic structures, one of said winding means is wound on its respective magnetic structure with the adjacent winding portions wound in a balanced overlapping relation to cause one of said teeth to be magnetically neutral to thereby define an asymmetrical relationship between said elements.

3. In an alternator, an armature, a magnetic field for said armature, at least one of said elements being defined with a magnetic structure having an odd plurality of conductor carrying slots spaced by teeth, and continuous winding means wound in said slots on said magnetic structure to define an asymmetrical magnetic relationship with the other element, said winding means being further characterized as being wound to provide an effective magnetic circuit having an even number of teeth with the odd tooth acting as a magnetic neutral and the windings arranged as mirror images about the magnetic neutral whereby the currents generated in said armature are displaced in phase to cause the combination of the harmonics generated to cancel while the fundamental waves generated are complementary and displaced in phase and when combined define a substantially harmonic free sinusoidal output wave.

4. In an alternator as defined in claim 3 wherein the odd number is a prime number and which number represents the first harmonic generated and appearing in the output wave, said prime number being a large number relative to the fundamental to have substantially no effect on the sinusoidal output wave.

5. In an alternator, an armature, a magnetic field for said armature, a magnetic structure for said armature and said field having spaced conductor slots therein, and winding means arranged in the spaced slots on said magnetic structure for each of said elements and with the winding means for one of said elements and its corresponding magnetic structure proportioned with respect to one another and the magnetic structure for the other element to define alternating and successive magnetic poles having effective pole centers progressively shifted in a preselected direction and coupling said elements in a balanced relationship relative to a magnetic neutral position on said magnetic structure to generate voltages in said winding means for the armature having fundamental and harmonic components whereby substantially all of the lower order harmonics cancel and a substantially sinusoidal output wave is produced.

6. In an alternator as defined in claim 5 wherein said magnetic structures comprise a plurality of teeth spaced apart by a prime number of slots and wherein one of said teeth is wound to form a magnetic neutral on said one element.

7. In an alternator, an armature, a magnetic field for said armature, said armature and said magnetic field including a magnetic structure having an odd number of conductor carrying slots spaced by magnetic teeth, winding means wound in the conductor carrying slots for said armature and said field, said field winding means is wound to provide a plurality of successively opposite magnetic poles disposed around said armature, said winding means for one of said elements being wound asymmetrically and proportioned with respect to the other element for causing the successive magnetic poles to have effectively progressively shifted pole centers, and means for energizing said field winding means.

8. In a non-salient pole alternator having an armature and a magnetic field for said armature, said magnetic field comprising a magnetic structure adapted for carrying winding means to define a magnetic field having a plurality of alternating and successive magnetic poles disposed around said armature, a continuous winding means wound on said magnetic structure in a balanced relationship and in a sense to provide a plurality of alternating and successive magnetic poles with each magnetic pole being similarly defined by two different winding portions having a common magnetic flux path and with one of said winding portions having a magnetic flux path overlapping the common magnetic flux path of the two winding portions defining the adjacent magnetic pole whereby a pair of said overlapping winding portions define a magnetic neutral position on said magnetic structure about which the thus defined field is balanced.

9. In a non-salient pole alternator of the type defined in claim 8 wherein the winding portions for each pole on opposite sides of the magnetic neutral have substantially the same number of turns in each winding portion and which windings have their two portions arranged with a different number of turns and progressing in different directions relative to said magnetic neutral while maintaining the total number of turns for each pole substantially the same.

10. In a non-salient pole alternator, an armature, a field structure having an odd number of conductor carrying slots spaced by magnetic teeth, a continuous winding means wound on said field structure by means of said conductor carrying slots to provide a plurality of successively opposite magnetic poles disposed around said armature, each magnetic pole is defined by two winding portions having different slot spans and arranged in a balanced relationship on said field structure and proportioned with respect to one another for defining the successive magnetic poles with progressively shifted pole centers, and means for energizing said winding.

11. In a non-salient pole alternator of the type defined in claim 10 wherein said odd number of slots is a prime number of conductor slots with a corresponding number of magnetic teeth and said winding means being proportioned whereby one of said teeth is magnetically neutral.

12. In a non-salient pole alternator of the type defined in claim 10 wherein said continuous winding means defines a field winding for a single phase and includes at least another similarly arranged and proportioned winding means provided for the conductor carrying slots of said magnetic structure and spaced from said first winding means in accordance with the phasing of said alternator.

13. In an alternator, an armature, a magnetic field for said armature, said armature and said magnetic field including a magnetic structure having an odd number of conductor carrying slots spaced by magnetic teeth, winding means wound in the conductor carrying slots for said armature and said field, said field winding means is wound to provide a plurality of successively opposite magnetic poles disposed around said armature, said winding means for one of said elements comprising serially connected winding portions having two winding portions with each of said two portions having different slot spans and arranged in a balanced relationship for effectively causing the successive magnetic poles to have progressively shifted pole centers, and means for energizing said field winding means.

14. In a dynamo-electric machine, an armature, a magnetic field for said armature, one of said elements being defined with a magnetic structure having a preselected plurality of conductor carrying slots, and continuous winding means wound in said slots on said magnetic structure to define an asymmetrical magnetic relationship with the other element whereby the currents generated in said armature are displaced in phase to cause the combination of the harmonics generated to cancel while the fundamental waves generated are complementary and displaced in phase and when combined define a substantially harmonic free sinusoidal wave.

15. In a dynamo-electric machine, an armature, a magnetic field for said armature, each of said elements being arranged with symmetrical magnetic structures having a preselected plurality of conductor carrying slots spaced by magnetic teeth, and winding means wound in said slots for each of said magnetic structures, one of said winding means is wound on its respective magnetic structure with the adjacent winding portions wound in a balanced overlapping relation to cause one of said teeth to be magnetically neutral to thereby define an asymmetrical relationship between said elements.

16. In a dynamo-electric machine, an armature, a magnetic field for said armature, one of said elements being constructed with a magnetic structure allowing an asymmetrical magnetic relationship to be defined between the armature and magnetic field, and continuous winding means wound on said magnetic structure to define the asymmetrical magnetic relationship with the other element whereby the currents generated in said armature are displaced in phase to cause the combination of the harmonics generated to cancel while the fundamental waves generated are complementary and displaced in phase and when combined define a substantially harmonic free sinusoidal wave.

References Cited in the file of this patent

FOREIGN PATENTS 1,005,167     Germany _____ Mar. 28, 1957